United States Patent
Rowell

(10) Patent No.: US 11,032,012 B2
(45) Date of Patent: Jun. 8, 2021

(54) RADIO FREQUENCY CHANNEL EMULATOR SYSTEM

(71) Applicant: Rohde & Schwarz GmbH & Co. KG, Munich (DE)

(72) Inventor: Corbett Rowell, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 38 days.

(21) Appl. No.: 16/000,522

(22) Filed: Jun. 5, 2018

(65) Prior Publication Data

US 2019/0372685 A1  Dec. 5, 2019

(51) Int. Cl.
*H04B 17/00* (2015.01)
*H04W 24/06* (2009.01)

(52) U.S. Cl.
CPC ........ *H04B 17/0087* (2013.01); *H04W 24/06* (2013.01)

(58) Field of Classification Search
CPC . H04L 317/0087; H04W 24/06; H04B 17/391
USPC ................. 455/67.14, 67.11, 67.12
See application file for complete search history.

(56) References Cited

U.S. PATENT DOCUMENTS

| | | | | |
|---|---|---|---|---|
| 4,751,455 A * | 6/1988 | Ayres | ...................... | G01R 29/26 324/613 |
| 5,423,072 A * | 6/1995 | Iwashita | ................ | G01R 29/10 343/703 |
| 5,532,704 A * | 7/1996 | Ruelle | ................... | G01R 29/105 174/384 |
| 6,184,623 B1 * | 2/2001 | Sugai | ................ | H01J 37/32082 118/723 AN |
| 7,839,136 B1 * | 11/2010 | John | ................... | G01R 29/0835 324/627 |
| 8,412,123 B2 * | 4/2013 | Foster | ..................... | H04K 3/415 455/134 |
| 8,513,963 B2 * | 8/2013 | Chen | ....................... | H04B 17/16 324/627 |
| 9,002,287 B2 * | 4/2015 | Mow | ....................... | G01R 29/10 455/13.3 |
| 2002/0160717 A1 * | 10/2002 | Persson | ............. | G01R 29/0821 455/67.11 |
| 2003/0008620 A1 * | 1/2003 | Rowell | ................ | G01R 29/105 455/67.11 |
| 2004/0012529 A1 * | 1/2004 | Teshirogi | ............... | H01Q 1/241 343/702 |
| 2005/0245195 A1 * | 11/2005 | Stevens | .................. | G06Q 10/08 455/67.11 |
| 2008/0265908 A1 * | 10/2008 | Hsieh | ................. | G01R 29/0821 324/555 |
| 2010/0233969 A1 * | 9/2010 | Frolik | ................ | H04B 17/0082 455/67.14 |

(Continued)

FOREIGN PATENT DOCUMENTS

WO   0072648 A1   11/2000

*Primary Examiner* — Diane D Mizrahi
(74) *Attorney, Agent, or Firm* — Ditthavong, Steiner & Mlotkowski

(57) ABSTRACT

A radio frequency channel emulator system is provided. Said system comprises a box with at least one measurement antenna arranged at an input, a device under test, an interchangeable lid or wall with a basic arrangement of resistive and/or conductive materials, and an output being connectable to signal measurement equipment.

15 Claims, 7 Drawing Sheets

(56) References Cited

U.S. PATENT DOCUMENTS

| | | | | |
|---|---|---|---|---|
| 2010/0285753 | A1* | 11/2010 | Foegelle | H04B 17/21 |
| | | | | 455/67.12 |
| 2010/0292971 | A1* | 11/2010 | Sachse | G08G 1/07 |
| | | | | 703/6 |
| 2011/0084887 | A1* | 4/2011 | Mow | G01R 29/10 |
| | | | | 343/703 |
| 2011/0306306 | A1* | 12/2011 | Reed | H04B 17/0085 |
| | | | | 455/67.11 |
| 2012/0225624 | A1* | 9/2012 | Kyosti | H01Q 3/2605 |
| | | | | 455/67.11 |
| 2013/0052962 | A1* | 2/2013 | Hansen | G01R 29/0871 |
| | | | | 455/67.12 |
| 2014/0141726 | A1* | 5/2014 | Schlub | G01R 29/0857 |
| | | | | 455/67.12 |
| 2014/0141727 | A1* | 5/2014 | Kildal | G01R 29/0821 |
| | | | | 455/67.12 |
| 2014/0194069 | A1* | 7/2014 | Liu | H04W 24/00 |
| | | | | 455/67.14 |
| 2014/0295771 | A1* | 10/2014 | Finlow-Bates | H04W 24/06 |
| | | | | 455/67.14 |
| 2014/0370821 | A1* | 12/2014 | Guterman | H04W 24/00 |
| | | | | 455/67.14 |
| 2015/0017928 | A1* | 1/2015 | Griesing | H04B 17/0085 |
| | | | | 455/67.14 |
| 2016/0212641 | A1* | 7/2016 | Kong | H04B 17/0087 |
| 2018/0034559 | A1* | 2/2018 | Foegelle | H04B 17/0085 |
| 2019/0068300 | A1* | 2/2019 | Lu | G01R 31/2822 |
| 2019/0273564 | A1* | 9/2019 | Vella-Coleiro | H04B 17/17 |

* cited by examiner

RADIO FREQUENCY CHANNEL EMULATOR SYSTEM

TECHNICAL FIELD

The invention relates to a radio frequency channel emulator system especially comprising a box with an interchangeable lid.

BACKGROUND ART

Generally, in times of an increasing number of applications providing wireless connectivity capabilities, there is a growing need of a radio frequency channel emulator system especially for verifying correct functioning of said applications in an efficient manner.

WO 00/72648 A1 discloses an integrated radiating enclosure. The enclosure housing is formed from a dielectric material with a radiating element formed on the exterior surface of the housing and a groundplane material formed on the interior of the housing. The groundplane provides electromagnetic interference shielding for the enclosed electronics. The three antenna elements are directly connected to the circuitry of a transceiver system, whereby integrating the transceiver antenna components directly into the transceiver enclosure. As can be seen, due to said integrated and thus inflexible configuration, the enclosure disadvantageously leads to a limited flexibility, and thus also to a reduced efficiency.

Accordingly, there is a need to provide a radio frequency channel emulator system especially comprising an interchangeable lid, thereby ensuring both a high flexibility and an increased efficiency.

SUMMARY OF THE INVENTION

According to an aspect of the invention, a radio frequency channel emulator system is provided. Said system comprises a box with at least one measurement antenna arranged at an input, a device under test, an interchangeable lid or wall with a basic arrangement of resistive and/or conductive materials, and an output being connectable to signal measurement equipment. Advantageously, in this manner, both a high flexibility and an increased efficiency can be ensured.

According to a first preferred implementation form of said aspect of the invention, at least some of the resistive and/or conductive materials of the basic arrangement of the interchangeable lid or wall are moving or at least movable. Advantageously, reflection characteristics of the lid or wall can accurately be adjusted.

According to a second preferred implementation form of said aspect of the invention, the interchangeable lid or wall comprises a simulating arrangement of at least one absorber and/or resistive and/or conductive materials such that different simulating arrangements simulate different radio frequency channel conditions. Advantageously, for instance, urban or rural channel conditions can be simulated in an efficient manner.

According to a further preferred implementation form of said aspect of the invention, the at least one absorber of the simulating arrangement is moving or at least movable. Advantageously, accuracy of the simulation of channel condition can be increased.

According to a further preferred implementation form of said aspect of the invention, at least some of the resistive and/or conductive materials of the simulating arrangement are moving or at least movable. Advantageously, accuracy of the simulation can further be increased.

According to a further preferred implementation form of said aspect of the invention, the at least one measurement antenna comprises at least two individual elements such that a specific dimension of the box is within a far-field region of said at least two individual elements. Advantageously, far-field measurements can be performed.

According to a further preferred implementation form of said aspect of the invention, the specific dimension of the box is the largest dimension of the box. Advantageously, far-field measurements can be performed in a most efficient manner.

According to a further preferred implementation form of said aspect of the invention, the at least one measurement antenna is an antenna array. Advantageously, for instance, measurements with respect to beamforming characteristics can be performed. In this context, it might be particularly advantageous if the antenna array is arranged to form a beamforming array, preferably a hybrid beamforming array, especially for simulating a base station antenna architecture.

According to a further preferred implementation form of said aspect of the invention, the antenna array comprises at least two antenna elements such that a specific dimension of the box is within a far-field region of said at least two antenna elements. Advantageously, far-field measurements can be performed.

According to a further preferred implementation form of said aspect of the invention, the specific dimension of the box is the largest dimension of the box. Advantageously, far-field measurements can be performed in a most efficient manner.

According to a further preferred implementation form of said aspect of the invention, the at least one measurement antenna is integrated into the interchangeable lid or wall. Advantageously, flexibility and efficiency can further be increased.

According to a further preferred implementation form of said aspect of the invention, at least one of the at least two individual elements is integrated into the interchangeable lid or wall. Advantageously, flexibility, and thus efficiency, can further be increased.

According to a further preferred implementation form of said aspect of the invention, at least one of the at least two antenna elements is integrated into the interchangeable lid or wall. Advantageously, in this manner, an enhancement with special respect to flexibility can be achieved.

According to a further preferred implementation form of said aspect of the invention, the box contains shielded portions. Advantageously, interferences can be reduced.

According to a further preferred implementation form of said aspect of the invention, the box contains unshielded portions. Advantageously, useful signals can pass through within the respective regions.

According to a further preferred implementation form of said aspect of the invention, the antenna array comprises at least two antenna elements, wherein the antenna array further comprises at least two different signals for each antenna element in order to simulate multiple input multiple output radio frequency channels. Advantageously, devices especially providing multiple input multiple output capabilities can be investigated in an efficient manner.

According to a further preferred implementation form of said aspect of the invention, the output is located within a region of the basic arrangement. Advantageously, the output can be accessed in an efficient manner.

According to a further preferred implementation form of said aspect of the invention, the output is located within a region of the simulating arrangement. Advantageously, the output can be accessed in an efficient manner and attenuation can significantly be reduced.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
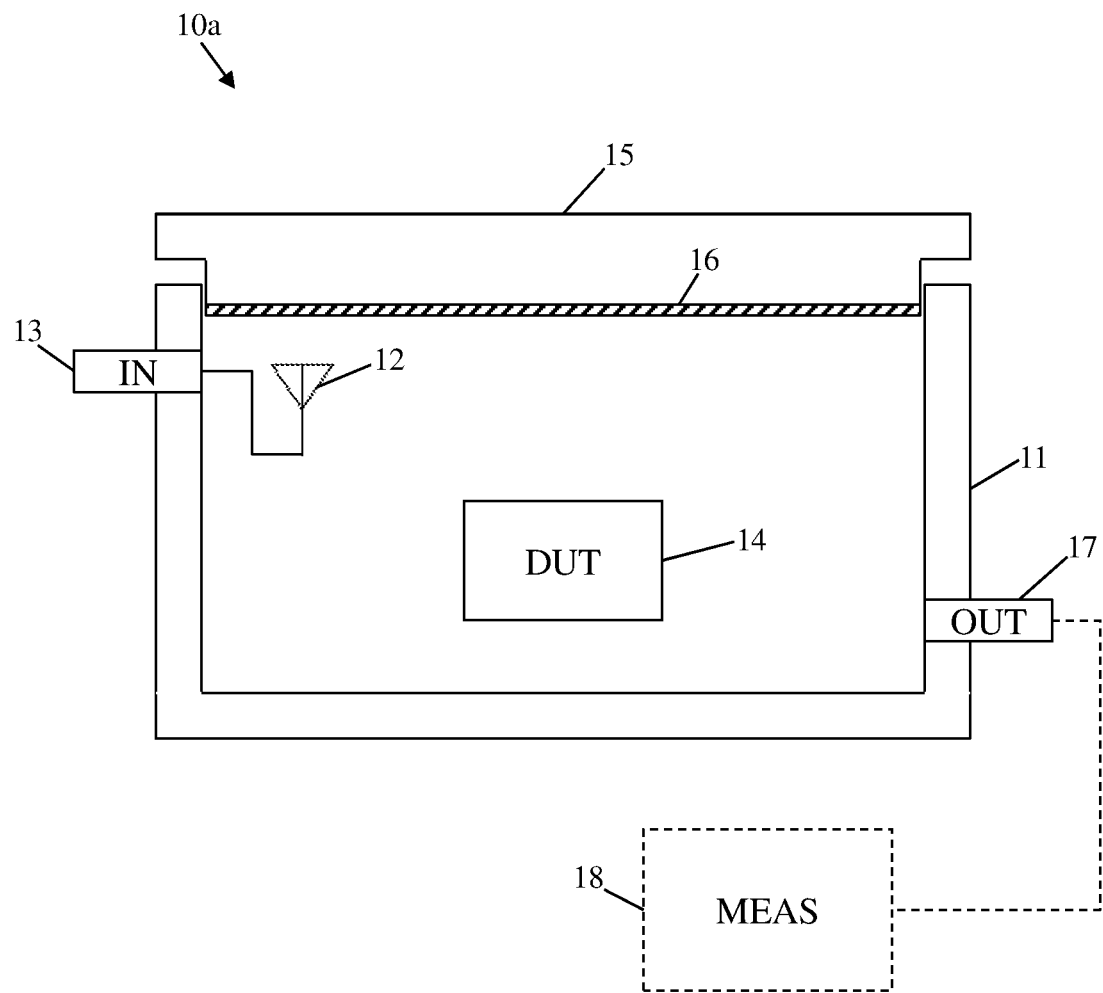
FIG. 1 shows an exemplary embodiment of the radio frequency channel emulator system according to the invention.

Firstly, FIG. 1 illustrates an exemplary embodiment of the inventive radio frequency channel emulator system 10. Said system 10 comprises a box 11 with at least one measurement antenna, exemplarily the measurement antenna 12, arranged at an input 13, a device under test 14, an interchangeable lid 15 or wall with a basic arrangement of resistive and/or conductive materials 16, and an output 17 being connectable to signal measurement equipment 18.

In this context, at least some of the resistive and/or conductive materials 16 of the basic arrangement of the interchangeable lid 15 or wall may preferably be moving or are at least movable.

Figure 2:
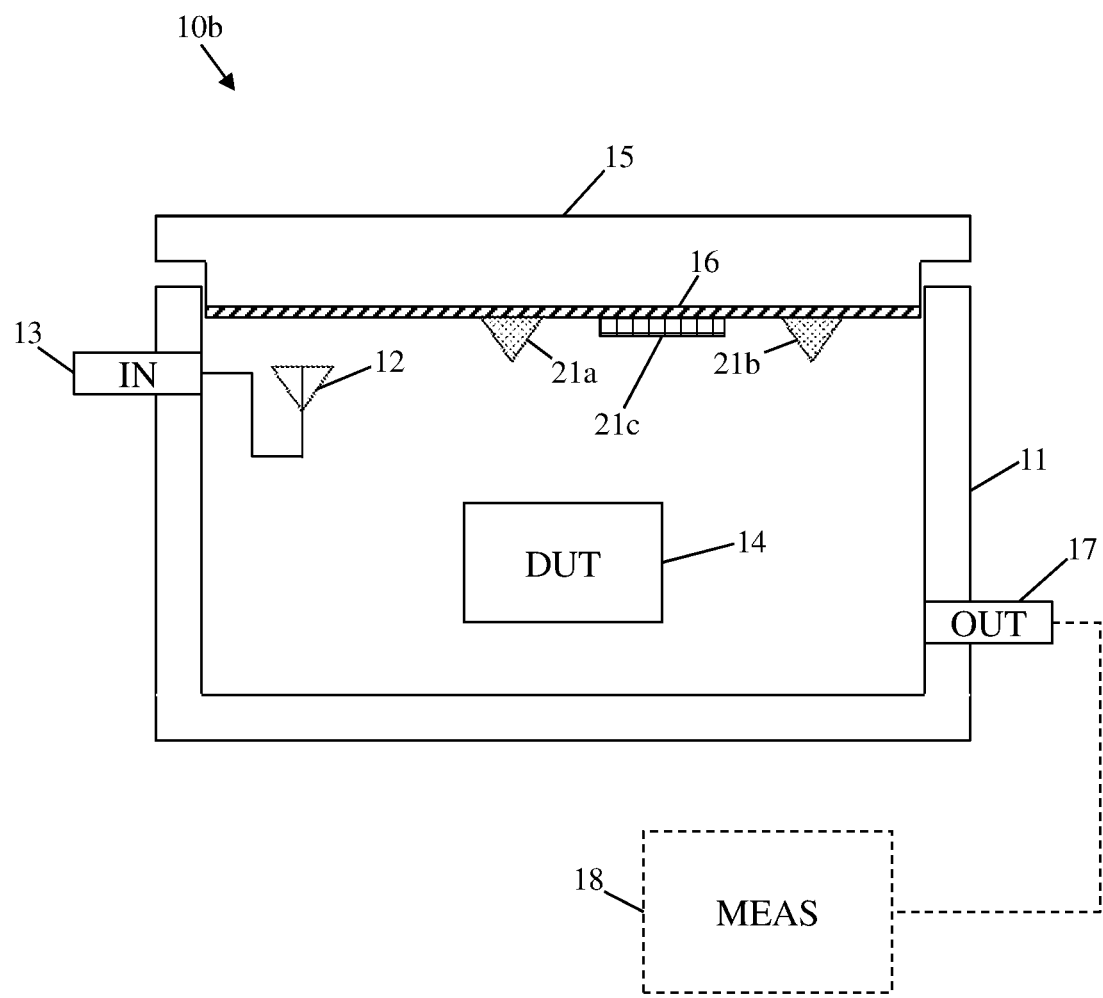
FIG. 2 shows a second exemplary embodiment of the inventive system.

Now, with respect to FIG. 2, a further exemplary embodiment of the inventive system 10b is shown. It is noted that parts of the system 10b, which have already been explained with respect to the first exemplary embodiment 10a according to FIG. 1, will not explicitly described again with respect to FIG. 2 and do therefore have the same reference signs.

As it can be seen from the second exemplary embodiment of the inventive system 10b, the interchangeable lid 15 or wall additionally comprises a simulating arrangement of at least one absorber, exemplarily the two absorber 21a, 21b and/or resistive and/or conductive materials, exemplarily represented by material region 21c, such that different simulating arrangements simulate different radio frequency channel conditions.

In this context, it might be particularly advantageous if the at least one absorber, exemplarily at least one of the two absorbers 21a, 21b, of the simulating arrangement is moving or at least is movable.

In addition to this or as an alternative, at least some of the resistive and/or conductive materials, exemplarily represented by the material region 21c, of the simulating arrangement may preferably be moving or at least is movable.

Further additionally or alternatively, the simulating arrangement may advantageously comprise a fan, preferably a fan with metal coated blades, being especially configured to assist in creating the desired channel model such as an urban or a rural channel model.

With respect to any of the above-mentioned embodiments or any further embodiment, it is noted that the at least one measurement antenna or the measurement antenna 12, respectively, may preferably comprise at least two individual elements such that a dimension of the box 11 is within a far-field region of said at least two individual elements.

In this context, it might be particularly advantageous if said dimension of the box 11 is especially the largest dimension of the box 11.

Figure 3:
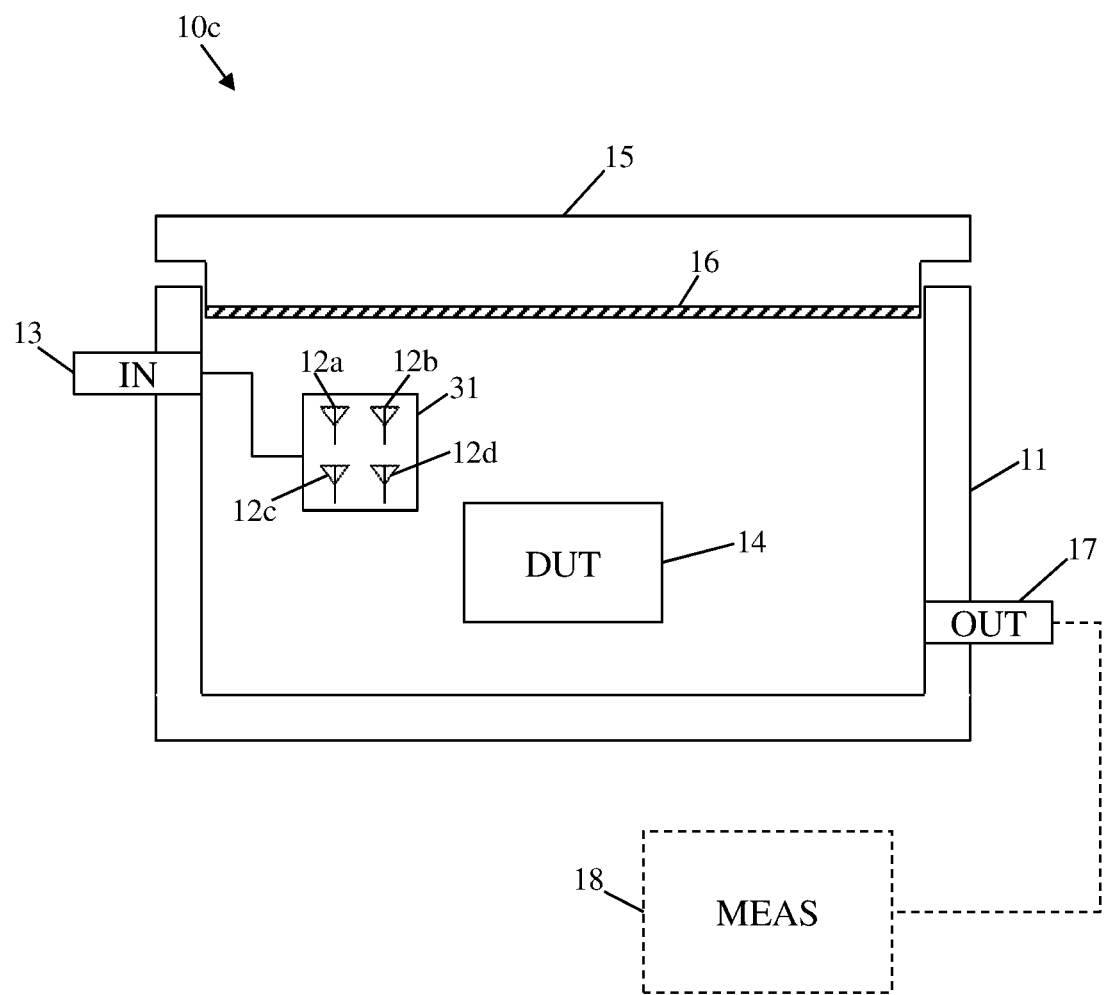
FIG. 3 shows a third exemplary embodiment of the inventive system.

Furthermore, in accordance with a further exemplary embodiment 10c of FIG. 3, the at least one measurement antenna may preferably be an antenna array 31. As it can be seen, said embodiment 10c especially is a further implementation form of the above-mentioned first exemplary embodiment 10a. It is noted that the second exemplary embodiment 10b can be modified in an analogous manner.

In addition to this or as an alternative, the antenna array 31 may preferably comprise at least two antenna elements, exemplarily four antenna elements 12a, 12b, 12c, 12d, such that a dimension of the box 11 is with a far-field region of said at least two antenna elements or the four exemplary antenna elements 12a, 12b, 12c, 12d, respectively.

In this context, it should be mentioned that it might be particularly advantageous if said dimension of the box 11 is the largest dimension of the box 11.

Figure 4:
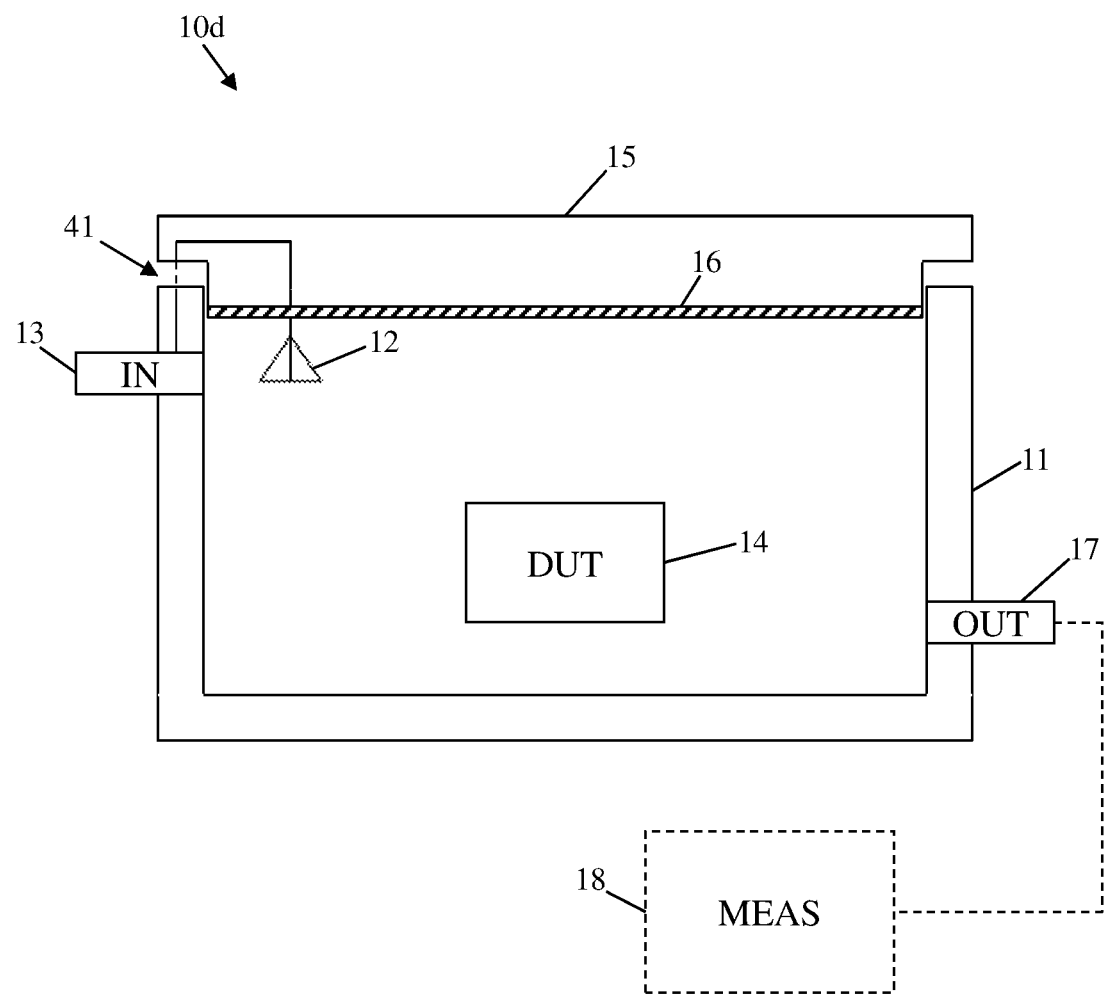
FIG. 4 shows a fourth exemplary embodiment of the inventive system.

Now, with respect to FIG. 4, a fourth exemplary embodiment of the radio frequency channel emulator system 10d is depicted. In this exemplary case, the at least one measurement antenna, exemplarily the measurement antenna 12 of the first embodiment 10a or of the second embodiment 10b, respectively, is integrated into the interchangeable lid 15 or wall.

By analogy with said integration, at least one of the above-mentioned at least two individual elements may preferably be integrated into the interchangeable lid 15 or wall.

By further analogy therewith, at least one of the above-mentioned at least two antenna elements, exemplarily of the four antenna elements 12a, 12b, 12c, 12d of the third exemplary embodiment 10c of FIG. 3, may preferably be integrated into the interchangeable lid 15 or wall.

In addition to this or as an alternative, the antenna array 31 may further comprise at least two different signals for each antenna element in order to simulate multiple input multiple output radio frequency channels.

At this point, it is noted that with respect to any of the above-mentioned embodiments or any further embodiment, the box 11 may preferably contain shielded portions. Additionally or alternatively, the box 11 may especially contain unshielded portions.

Again, with respect to FIG. 4, as it can be seen, the box and the lid 15 comprise a contacting region 41 for connecting the measurement antenna 12 integrated into the lid with the input 13 especially integrated into the box 11. With respect to said contacting region 41, it might be particularly advantageous if the respective contact is especially made when the box 11 has been closed with the aid of the lid 15.

Figure 5:
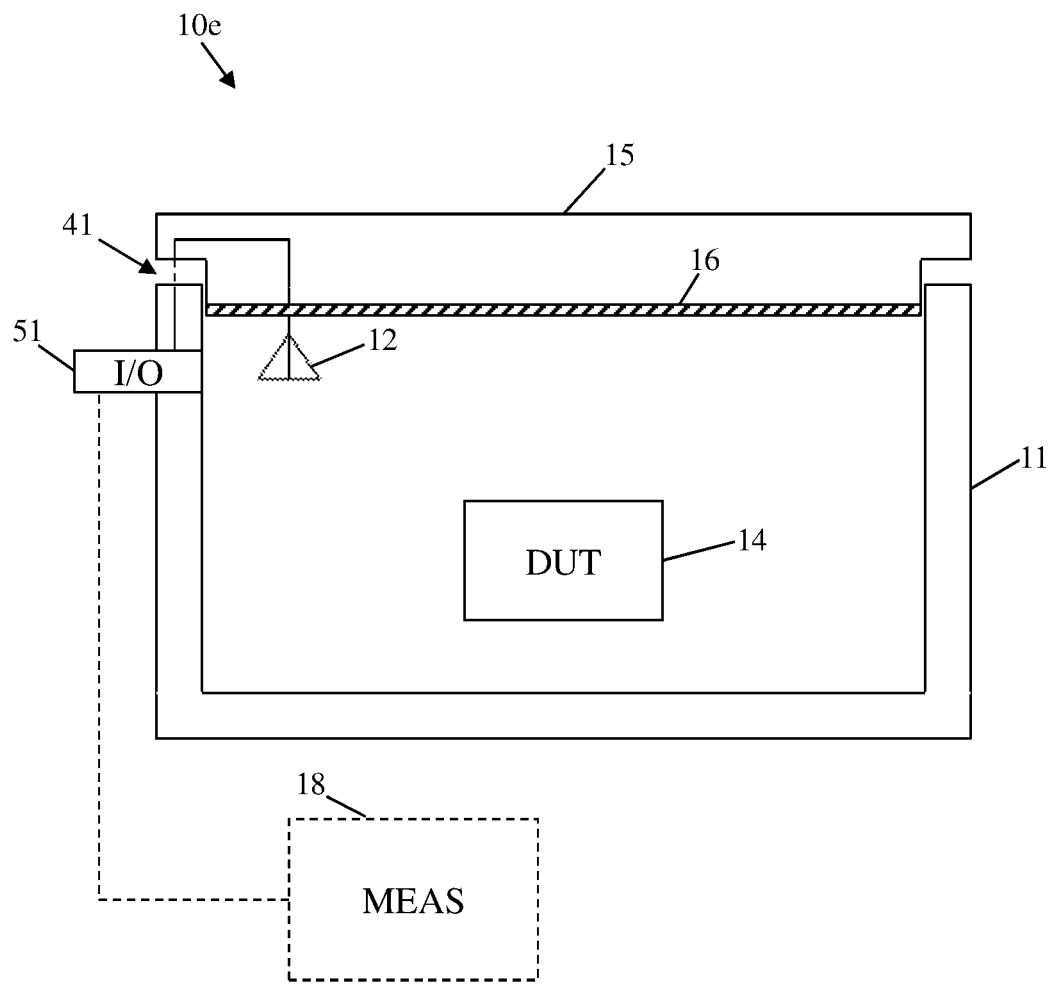
FIG. 5 shows a fifth exemplary embodiment of the inventive system.

Furthermore, according to FIG. 5 showing another embodiment 10e of the inventive system, it can be seen that the input 13 can advantageously be combined with the output 17 in order to form a combined input output 51 being connectable to both the measurement equipment 18 and the measurement antenna 12. In this context, it is noted that with respect to the above-mentioned embodiments, the combined input output 51 may preferably be connectable to the both the measurement equipment 18 and at least one antenna element of the antenna array 31 or at least one individual element of the measurement antenna, respectively.

Figure 6:
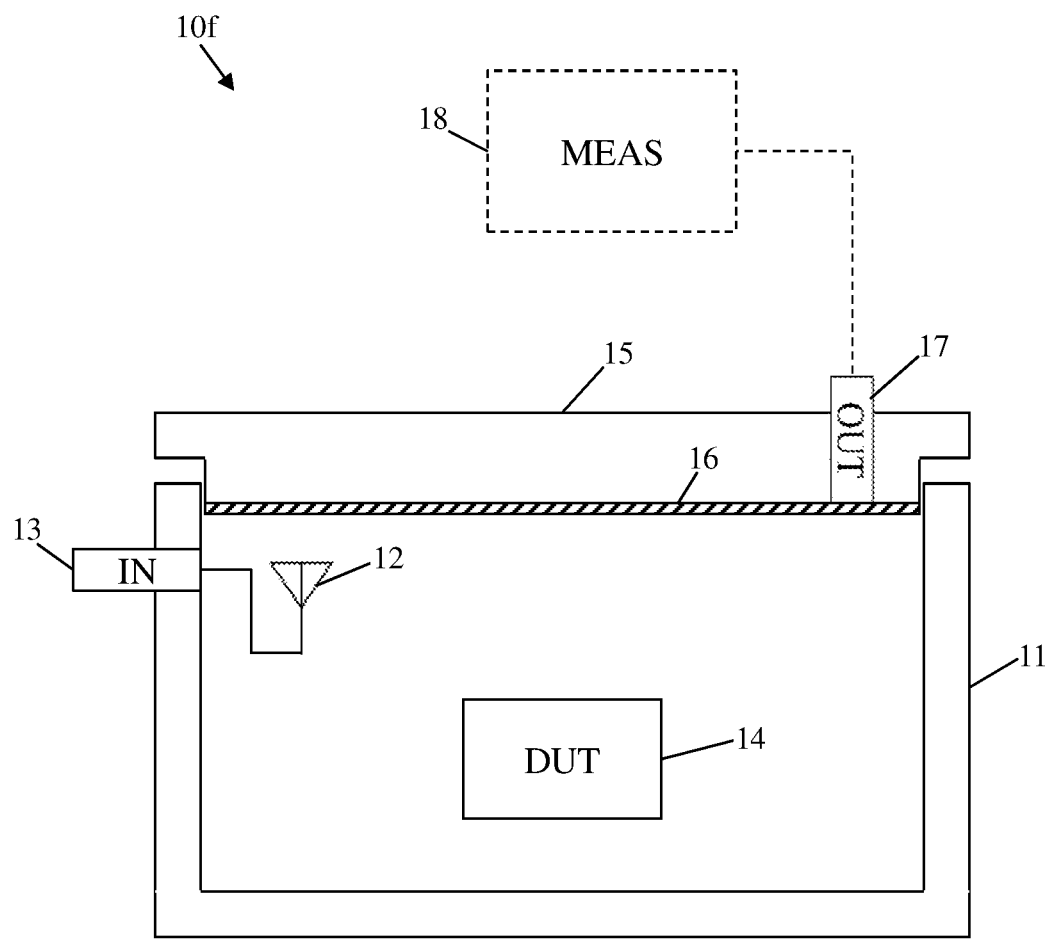
FIG. 6 shows a sixth exemplary embodiment of the inventive system.

Now, with respect to FIG. 6, a further exemplary embodiment of the radio frequency channel emulator system 10f according to the invention is depicted. In this exemplary case, the output 17 is especially located within a region of the basic arrangement 16. Alternatively, the combined input output 51 according to the fifth embodiment of FIG. 5 may preferably be located within the region of the basic arrangement 16.

Figure 7:
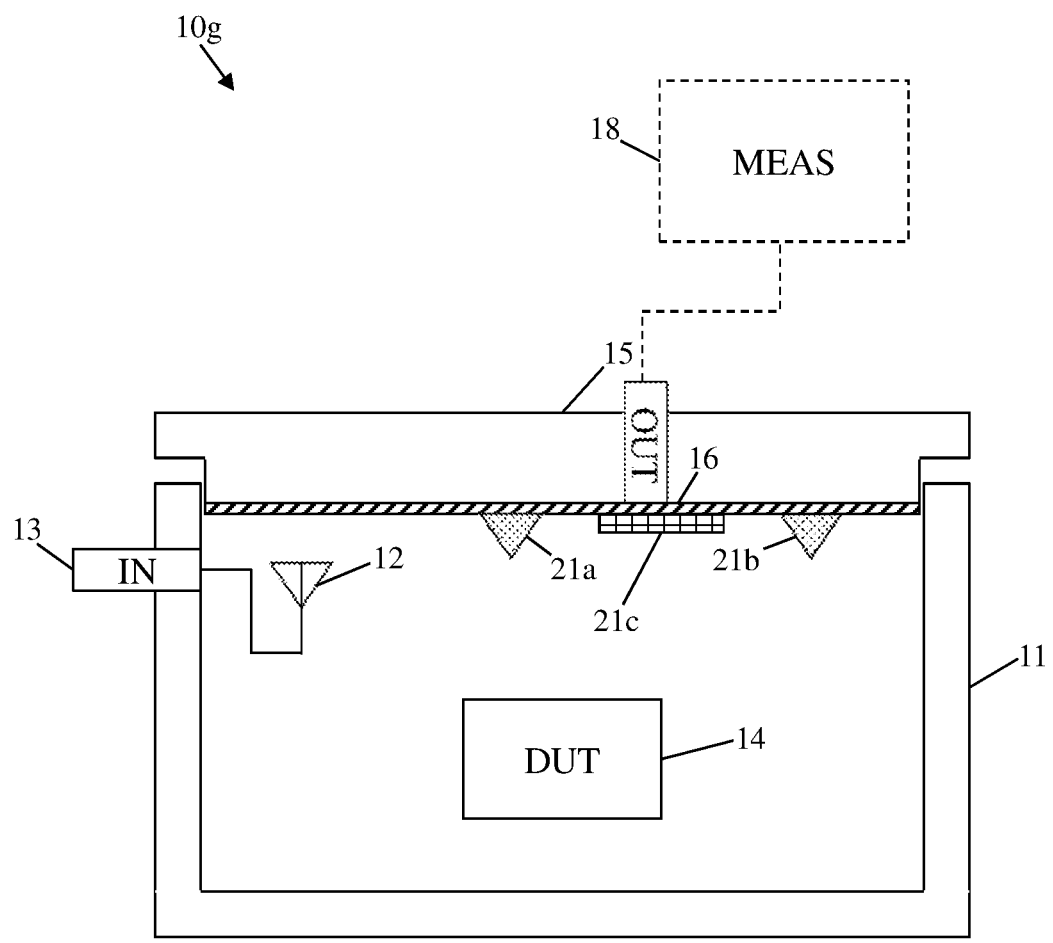
FIG. 7 shows a seventh exemplary embodiment of the radio frequency channel emulator system in accordance with the invention.

Moreover, FIG. 7 illustrates a further exemplary embodiment 10g of the inventive system, wherein the output 17 is especially located within a region of the simulating arrangement 21c. As an alternative, the combined input output 51 according to the fifth embodiment of FIG. 5 may preferably be located within the region of the simulating arrangement 21c.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A radio frequency channel emulator system comprising:
    a box with at least one measurement antenna arranged at an input,
    a device under test,
    an interchangeable lid or wall with a basic arrangement of resistive and/or conductive materials, and
    an output being connectable to signal measurement equipment,
    wherein the interchangeable lid or wall comprises a simulating arrangement of at least one absorber and/or resistive and/or conductive materials such that different simulating arrangements simulate different radio frequency channel conditions, and wherein the simulating arrangement comprises a fan with metal coated blades,
    wherein the at least one measurement antenna is integrated into the interchangeable lid or wall,
    wherein the box and the interchangeable lid or wall comprise a contacting region for connecting the at least one measurement antenna with the input integrated into the box, wherein the respective contact is made when the box has been closed with the aid of the interchangeable lid or wall,
    wherein the fan is configured to assist in creating a rural channel model,
    wherein the at least one measurement antenna comprises at least two individual elements such that a specific dimension of the box is within a far-field region of said at least two individual elements, and
    wherein the input is combined with the output in order to form a combined input output being located within the region of the simulating arrangement and being connectable to both the signal measurement equipment and at least one individual element of the at least one measurement antenna.

2. The radio frequency channel emulator system according to claim 1, wherein at least some of the resistive and/or conductive materials of the basic arrangement of the interchangeable lid or wall are moving or are movable.

3. The radio frequency channel emulator system according to claim 1,
    wherein the at least one absorber of the simulating arrangement is moving or is movable.

4. The radio frequency channel emulator system according to claim 1,
    wherein at least some of the resistive and/or conductive materials of the simulating arrangement are moving or are movable.

5. The radio frequency channel emulator system according to claim 1,
    wherein the specific dimension of the box is the largest dimension of the box.

6. The radio frequency channel emulator system according to claim 1, wherein the at least one measurement antenna is an antenna array.

7. The radio frequency channel emulator system according to claim 6,
    wherein the antenna array comprises at least two antenna elements such that a specific dimension of the box is within a far-field region of said at least two antenna elements.

8. The radio frequency channel emulator system according to claim 7,
    wherein the specific dimension of the box is the largest dimension of the box.

9. The radio frequency channel emulator system according to claim 7,
    wherein at least one of the at least two antenna elements is integrated into the interchangeable lid or wall.

10. The radio frequency channel emulator system according to claim 6,
    wherein the antenna array comprises at least two antenna elements,
    wherein the antenna array further comprises at least two different signals for each antenna element in order to simulate multiple input multiple output radio frequency channels.

11. The radio frequency channel emulator system according to claim 1, wherein at least one of the at least two individual elements is integrated into the interchangeable lid or wall.

12. The radio frequency channel emulator system according to claim 1,
    wherein the box contains shielded portions.

13. The radio frequency channel emulator system according to claim 1,
    wherein the box contains unshielded portions.

14. The radio frequency channel emulator system according to claim 1,
    wherein the output is located within a region of the basic arrangement.

15. The radio frequency channel emulator system according to claim 1, wherein the output is located within a region of the simulating arrangement.

\* \* \* \* \*